US012613353B2

(12) United States Patent
Fu

(10) Patent No.: US 12,613,353 B2
(45) Date of Patent: Apr. 28, 2026

(54) ENHANCED PROJECTION ON CONVEX SETS FOR INTERPOLATION AND DEBLENDING

(71) Applicant: BP Corporation North America Inc., Houston, TX (US)

(72) Inventor: Kang Fu, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 771 days.

(21) Appl. No.: 17/775,661

(22) PCT Filed: Oct. 20, 2020

(86) PCT No.: PCT/US2020/056434
§ 371 (c)(1),
(2) Date: May 10, 2022

(87) PCT Pub. No.: WO2021/126360
PCT Pub. Date: Jun. 24, 2021

(65) Prior Publication Data
US 2022/0413175 A1 Dec. 29, 2022

Related U.S. Application Data

(60) Provisional application No. 62/949,743, filed on Dec. 18, 2019.

(51) Int. Cl.
*G01V 1/34* (2006.01)
*G01V 1/30* (2006.01)

(52) U.S. Cl.
CPC ............... *G01V 1/345* (2013.01); *G01V 1/30* (2013.01); *G01V 2210/1293* (2013.01); *G01V 2210/1423* (2013.01); *G01V 2210/43* (2013.01)

(58) Field of Classification Search
CPC .. G01V 1/345; G01V 1/30; G01V 2210/1293; G01V 2210/43
See application file for complete search history.

(56) References Cited

U.S. PATENT DOCUMENTS

| | | | | |
|---|---|---|---|---|
| 9,348,050 B2 * | 5/2016 | Krohn | ................... | G01V 1/364 |
| 2010/0212909 A1 | 8/2010 | Baumstein et al. | | |
| 2017/0371055 A1 * | 12/2017 | Poole | ................... | G01V 1/375 |

FOREIGN PATENT DOCUMENTS

| | | |
|---|---|---|
| CN | 105425301 B | 10/2018 |
| CN | 108680953 B | 7/2019 |

(Continued)

OTHER PUBLICATIONS

Singapore Search Report and Written Opinion dated Dec. 2, 2024, for Singapore Application No. 11202250329F (2834-27705) (10 p.).

(Continued)

*Primary Examiner* — Michael J Dalbo
*Assistant Examiner* — Kaleria Knox
(74) *Attorney, Agent, or Firm* — CONLEY ROSE, P.C.

(57) ABSTRACT

Seismic data may provide valuable information with regard to the description such as the location and/or change of hydrocarbon deposits within a subsurface region of the Earth. The present disclosure generally discusses techniques that may be used by a computing system to interpolate or deblend data utilizing a projection on convex sets (POCS) interpolation algorithm. The utilized POCS interpolation algorithm operates in parallel for frequency of a set of frequencies of a seismic frequency spectrum.

20 Claims, 9 Drawing Sheets

(56)  References Cited

FOREIGN PATENT DOCUMENTS

GB          2460175 A  *  11/2009  ............... G01V 1/36
WO     WO-2016053945 A1 *  4/2016  ............. G01V 1/003

OTHER PUBLICATIONS

PCT/US2020/056434 International Search Report and Written Opinion dated Feb. 8, 2021 (11 p.).
PCT/US2020/056434 Submission of Informal Comments to the Written Opinion dated Feb. 8, 2021; Response iled Mar. 17, 2021 (4 p.).
Abma, Ray et al., "Annual Meeting Selections: 3D Interpolation of Irregular Data with a POCS Algorithm," Geophysics, vol. 71, No. 6, Jan. 1, 2006, pp. E91-E97 (7 p.).

* cited by examiner

10

12

Locate hydrocarbon deposits based on analyzed seismic data

14

Drill into subsurface regions based on location

16

Produce hydrocarbons

18

Transport produced hydrocarbons

20

Refining produced hydrocarbons

22

30

32    32    36 36    36 36    36 36

34

24

28

26

ENHANCED PROJECTION ON CONVEX SETS FOR INTERPOLATION AND DEBLENDING

CROSS-REFERENCE TO RELATED APPLICATIONS

This application is a 35 U.S.C. § 371 U.S. National Stage Entry application of PCT/US2020/056434 filed Oct. 20, 2020, and entitled "Enhanced Projection on Convex Sets for Interpolation and Deblending," which claims benefit of U.S. provisional patent application Ser. No. 62/949,743 fled Dec. 18, 2019, and entitled "Enhanced Projection on Convex Sets for Interpolation and Deblending," each of which is hereby incorporated herein by reference in its entirety for all purposes.

BACKGROUND

The present disclosure relates generally to seismic image generation, and more specifically, to signal recovery techniques to enhance existing interpolation and deblending operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., acoustic wave) signal that travels downward through the Earth, is reflected, and, upon its return, is recorded using one or more receivers disposed on or above the subsurface region of the Earth. The seismic data recorded by the receivers may be used to create an image or profile of the corresponding subsurface region.

Collected seismic data often has skips, gaps, etc. that do not reflect regular samples, which may cause issues for seismic processing algorithms (e.g., migration). To aid in correcting the seismic data to allow for better seismic processing, one or more interpolation schemes may be implemented that utilize existing trace data to construct new data points in the skips or gaps of the collected seismic data. One interpolation technique is a class of estimators known as "Projection Onto Convex Sets" ("POCS") interpolation algorithms.

In traditional seismic acquisition, acoustic energy sources generate seismic signals with large enough time intervals such that the recorded seismic data from each of the source excitations do not overlap. With simultaneous source acquisition, the time interval requirement is not enforced, resulting in a blended seismic recording from different source excitations. The seismic processing that is used to separate the blended seismic data corresponding to their respective source excitations, namely deblending processing, allows the seismic data to be processed as the traditionally acquired seismic data. The POCS scheme is one of the methods used in inversion-based deblending processing.

While POCS has been proven to be useful as an interpolation/deblending scheme, it has disadvantages in that it is a relatively slow and expensive process (due to the significant amount of time and computer resources used in the calculations). Thus, if the complexity and/or time needed to implement POCS could be reduced, many datasets that have traditionally avoided use of POCS could benefit from its application.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced using seismic waveforms produced by a source, reflected off regions within a subsurface, and received by one or more receivers. However, gaps in received seismic data may limit the accuracy of the generated seismic images.

A Projection Onto Convex Sets ("POCS") interpolation algorithm interpolation scheme may be implemented that utilizes existing trace data to construct new data points in the skips or gaps of the received seismic data. However, the implemented POCS interpolation algorithm described herein includes parallelization of thresholding across all frequency bands, beginning with maximum threshold values generated from every individual frequency or frequency band. In this manner, the reconstruction/interpolation/deblending will work on all frequency bands based on the events' coherence relative to other events' coherence within every frequency band. An advantage of this technique can be that there may be a significant reduction on the number of iterations, i.e., by a factor of 10 or more, relative to a implementation of other POCS interpolation algorithms, which reduces the cost and/or time needed to implement interpolation using the POCS interpolation algorithm while simultaneously providing for greater accuracy in seismic data generated with respect to certain frequencies of a seismic frequency spectrum, allowing for greater availability of the present POCS interpolation algorithm to be applied to datasets.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Analysis of seismic data may provide valuable information, such as the location and/or change of hydrocarbon deposits within a subsurface region of the Earth. The present disclosure generally discusses techniques that may be used to interpolate seismic data utilizing a Projection Onto Convex Sets ("POCS") interpolation algorithm that parallelizes thresholding across all frequency bands. Utilization of this present POCS interpolation algorithm provides a significant reduction on the number of iterations required, and utilization of the algorithm can improve resolution of the data generated for one or more frequencies of a seismic frequency spectrum.

Figures 1, 2:
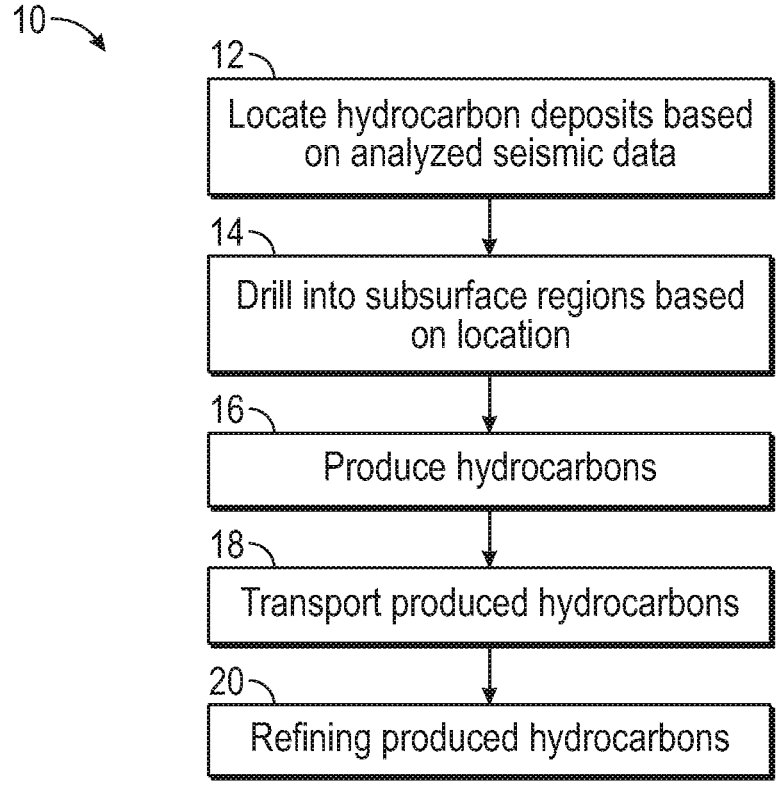
FIG. 1 illustrates a flow chart of various processes that may be performed based on analysis of seismic data acquired via a seismic survey system, in accordance with embodiments presented herein.
FIG. 2 illustrates a marine survey system in a marine environment, in accordance with embodiments presented herein.
Figure 2A:
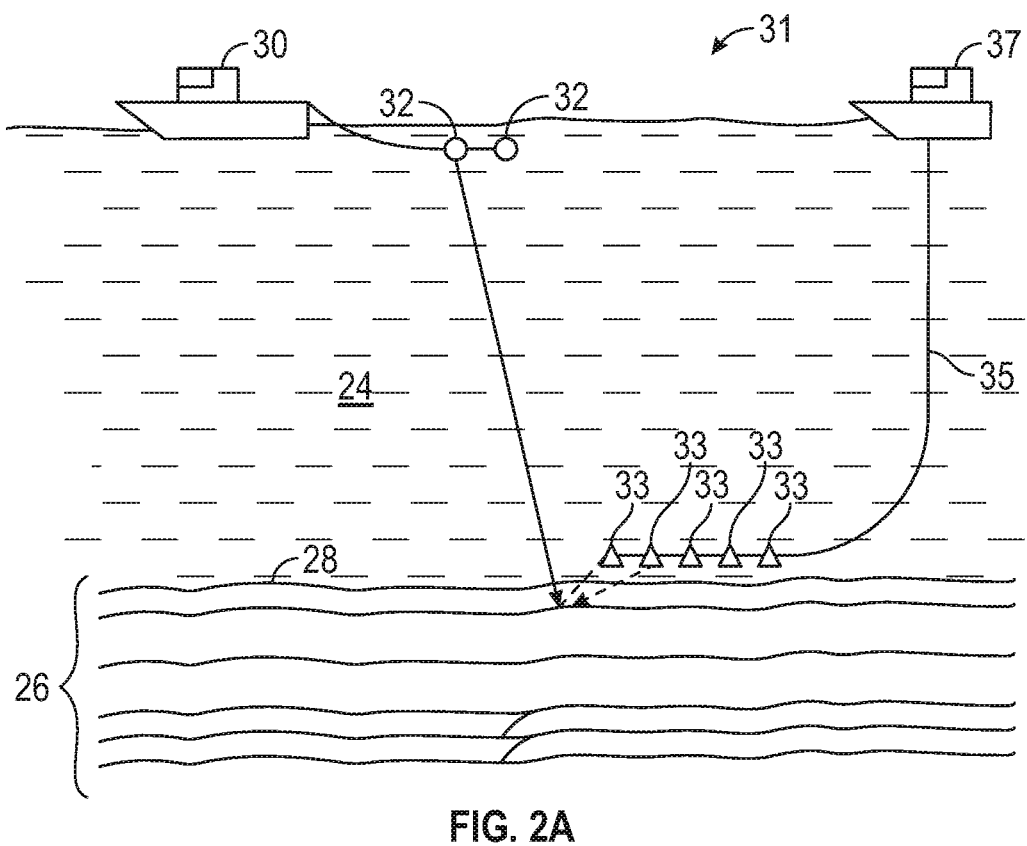
FIG. 2A illustrates a second marine survey system in a marine environment, in accordance with embodiments presented herein.
Figure 3:
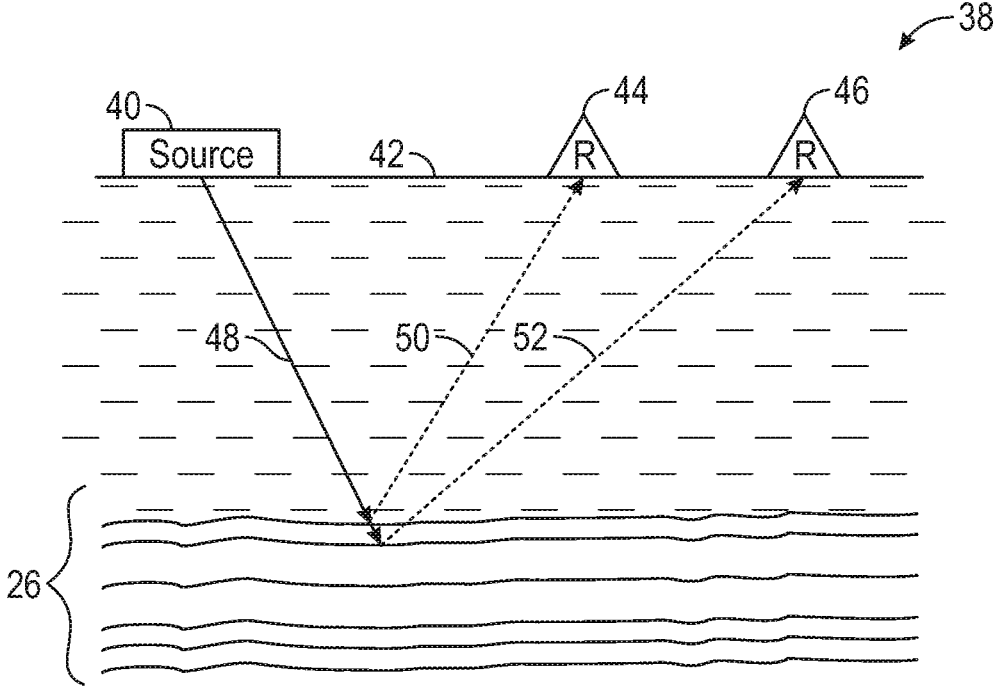
FIG. 3 illustrates a land survey system in a land environment, in accordance with embodiments presented herein.

By way of introduction, seismic data may be acquired using a variety of seismic survey systems and techniques, examples of which are discussed with respect to FIG. 2, FIG. 2A, and FIG. 3. Regardless of the gathering technique utilized, after the seismic data is acquired, a computing system may analyze the acquired seismic data and use results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like, via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an airgun array) that may produce energy, such as acoustic waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations salt domes, faults, folds, etc.) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

FIG. 2A illustrates an Ocean Bottom Seismic (OBS) system 31 as a second marine survey system (e.g., for use in conjunction with block 12 of FIG. 1) that also may be employed to acquire seismic data (e.g., waveforms) regarding a subsurface region of the Earth in a marine environment. The OBS system 31 may operate to generate seismic data (e.g., OBS datasets). While the illustrated OBS system 31 is an Ocean Bottom Cable (OBC) system inclusive of one or more receivers 33 disposed on the seafloor 28 coupled via a cable 35 to a second vessel 37, other embodiments of an OBS system 31, such as an Ocean Bottom Node (OBN) system or any other seismic system that produces higher signal-to-noise images at differing frequencies compared to those of the marine survey system 22 may be utilized.

As illustrated, the OBS system 31 may include a seismic source 32 (e.g., an airgun array) that is towed by a vessel 30 and which may produce energy, such as sound waves (e.g., seismic waveforms), that is directed at the seafloor 28. This energy may be reflected off of various geological formations within the subsurface region 26 and subsequently acquired (e.g., received and/or recorded) by the one or more receivers 33 disposed on the seafloor 28. For example, data may be stored in the one or more receivers 33 for an extended period of time (e.g., hours, days, weeks, or longer) prior to the stored data being retried (either via cable 35 or wirelessly). As illustrated, the one or more receivers 33 may be coupled to a vessel 37 (and, in some embodiments, to one another) via the cable 35. Data acquired via the one or more receivers 33 may be transmitted via the cable 35 to the vessel 37 (or, for example, stored in the receivers 33 until the receivers 33 are retrieved by Remotely Operated Vehicles if OBS system 31 is an OBN system).

In some embodiments, the OBS system 31 may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3DHR datasets. Therefore, the OBS dataset is complementary with respect to a bandwidth that a 3DHR dataset acquired via the marine survey system 22 (e.g., acquired via a 2D high-resolution seismic acquisition, a 3D high-resolution seismic acquisition, or the like).

Other non-marine seismic systems used to gather seismic data are additionally envisioned for use with the present techniques. For example, FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., acoustic waves, seismic waveforms) directed at the subsurface region 26 of the Earth. Upon reaching various geological formations (e.g., salt domes, faults, folds) within the subsurface region 26, the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
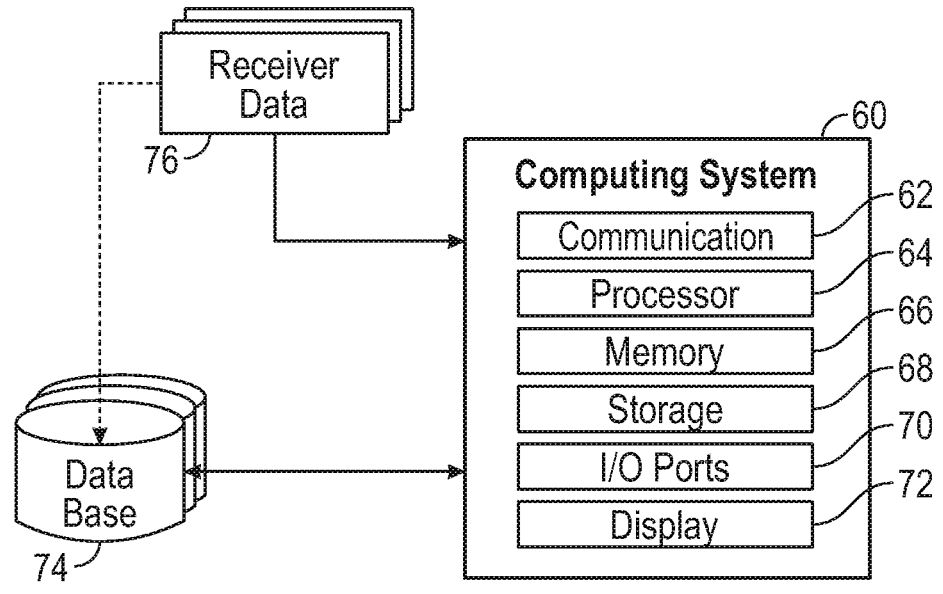
FIG. 4 illustrates a computing system that may perform operations described herein based on data acquired via the marine survey systems of FIG. 2, FIG. 2A, and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 33 or 36 or the (land-based) seismic receivers 44 aid/or 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22 the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLEO) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases

74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the receivers 36, 44, 46, or the like. Further, it may be noted that the listed components are provided as example components, and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that may extend for some distance. In a two-dimensional (2-D) seismic survey, the receiver locations may be placed along a single line, whereas, in a three-dimensional (3-D) survey, the receiver locations may be distributed across the surface in a grid pattern. As such, a 2-D seismic survey may provide a cross sectional picture (vertical slice) of Earth layers present directly beneath the recording locations. A 3-D seismic survey, on the other hand, may create a data "cube" or volume that may correspond to a 3-D picture of the subsurface region 26.

In addition, a four-dimensional (4-D) or time-lapse seismic survey may include seismic data acquired during a 3-D survey at multiple times. Using the different seismic images acquired at different times, the computing system 60 may compare the two images to identify changes in the subsurface region 26.

In any case, a seismic survey may include a large number of individual seismic recordings (e.g., seismic traces, traces). As such, the computing system 60 may analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
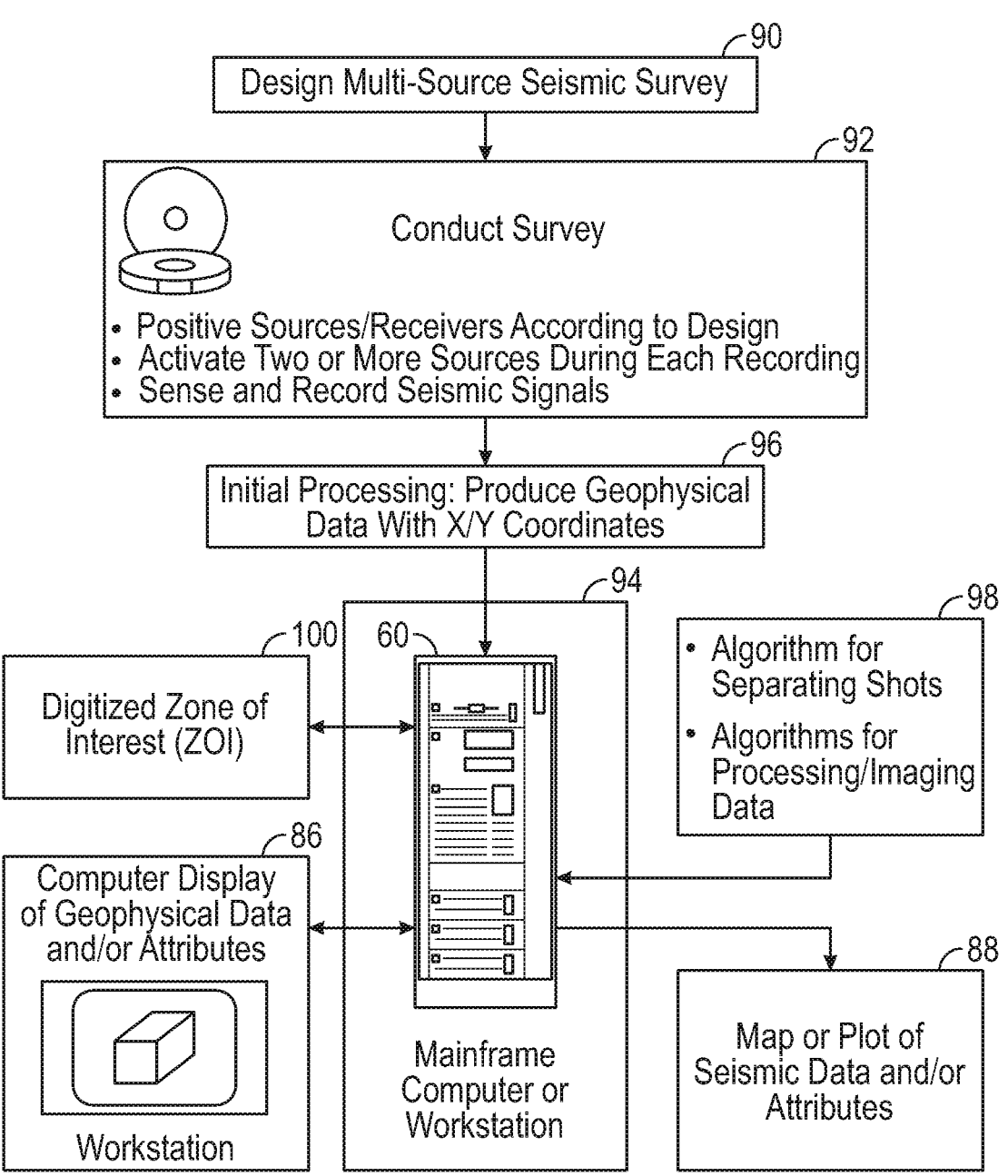
FIG. 5 illustrates the computing system of FIG. 4 receiving a survey design and analyzing data gathered according to the survey design, in accordance with embodiments presented herein.

In some embodiments, a seismic image may be generated in conjunction with a seismic processing scheme such as, for example, a computer display of geophysical data and/or attributes (block 86) or a map and/or plot of seismic data and/or attributes (block 88), such as a paper or printed map and/or plot, as illustrated in FIG. 5, by the computing system 60 (and more specifically, the processor 64 operating in conjunction with at least one of the memory 66 or the storage 68). FIG. 5 illustrates an example system that may use the techniques described herein. A seismic survey may be designed by an explorationist, or operator, (block 90) to cover a region of economic interest. Field acquisition parameters (e.g., shot spacing, line spacing, fold, source type, etc.) are typically selected during the design of the seismic survey, although it is common to modify ideal design parameters during actual execution of the seismic survey (e.g., in the field) to accommodate realities of conducting the survey.

Seismic data (e.g., seismic traces) may be collected during the execution of the seismic survey (block 92). The seismic data may be collected over a subsurface region (e.g., target) of economic interest, and are typically sent thereafter to a processing center (block 94), where the traces are made more suitable for use in exploration. In some cases, there may be some amount of initial data processing performed while the data are still in the field and/or by the processing center (block 96). The initial data processing operations may facilitate preparing the seismic traces for analysis and/or use by the operator, and may involve retrieving and/or storing at least part of the seismic data into a memory. For example, on a storage device such as a hard disk, magnetic tape, solid state drive, magneto-optical disk, DVD disk, cloud storage, or other suitable storage technique. As described above, during the execution of the seismic survey there may be two more overlapping simultaneous sources of a same type, and/or there may be two or more overlapping simultaneous sources of different types. As described above, the recordings of different sources may have been combined in a single volume.

The computing system 60 may implement the described methods based at least in part on a software application storing instructions as depicted in block 98. The software application may be installed into the memory 66 and executable by the processor 64 (e.g., one or more processors) of the computing system 60 to execute algorithms for separating shots and/or for processing/imaging of the seismic data. Although not specifically depicted, the computing system 60 may include mainframes, servers, workstations, super computers, a network of computers supporting parallel computations (e.g., where a computational load may be distributed between two or more processors of the network of computers), or the like.

As is also illustrated in FIG. 5, in some embodiments, the computing system 60 may implement the described methods based at least in part on a digitized zone of interest (ZOI) model (e.g., represented via block 100). The ZOI model may be specified by the user and provided as input to the processing computer program. In the case of a 3-D seismic section, the ZOI model may include specifics as to the lateral extent and thickness (which might be variable and/or measured in time, depth, frequency, or the like) of a subsurface target. It is noted that the zones may be created, picked, digitized, stored, and later read during program execution using any suitable system and/or method.

Software applications (e.g., represented via the blocks 86, 88, 98, 100) may be conveyed into the computing system 60 via, for example, a floppy disk, a magnetic disk, a magnetic tape, a magneto-optical disk, an optical disk, a compact disc read-only memory (CD-ROM), a digital versatile disk (or digital video disk) (DVD), a random-access memory (RAM) card, flash random-access memory (RAM), a read-only memory (ROM) card, a programmable read-only memory (PROM) chip, or loaded over a network (e.g., a wired or wireless network, etc.). After processing, resulting traces may be sotted into gathers. The gathers may be stacked and/or displayed either via the display 72 (e.g., represented via the block 86) and/or as a printed seismic section or a map resulting from printing operations (e.g., represented via the block 88). The seismic interpreter may use the displayed images to assist in identification of subsurface features conducive to the generation, migration, and/or accumulation of hydrocarbons.

Figure 6:
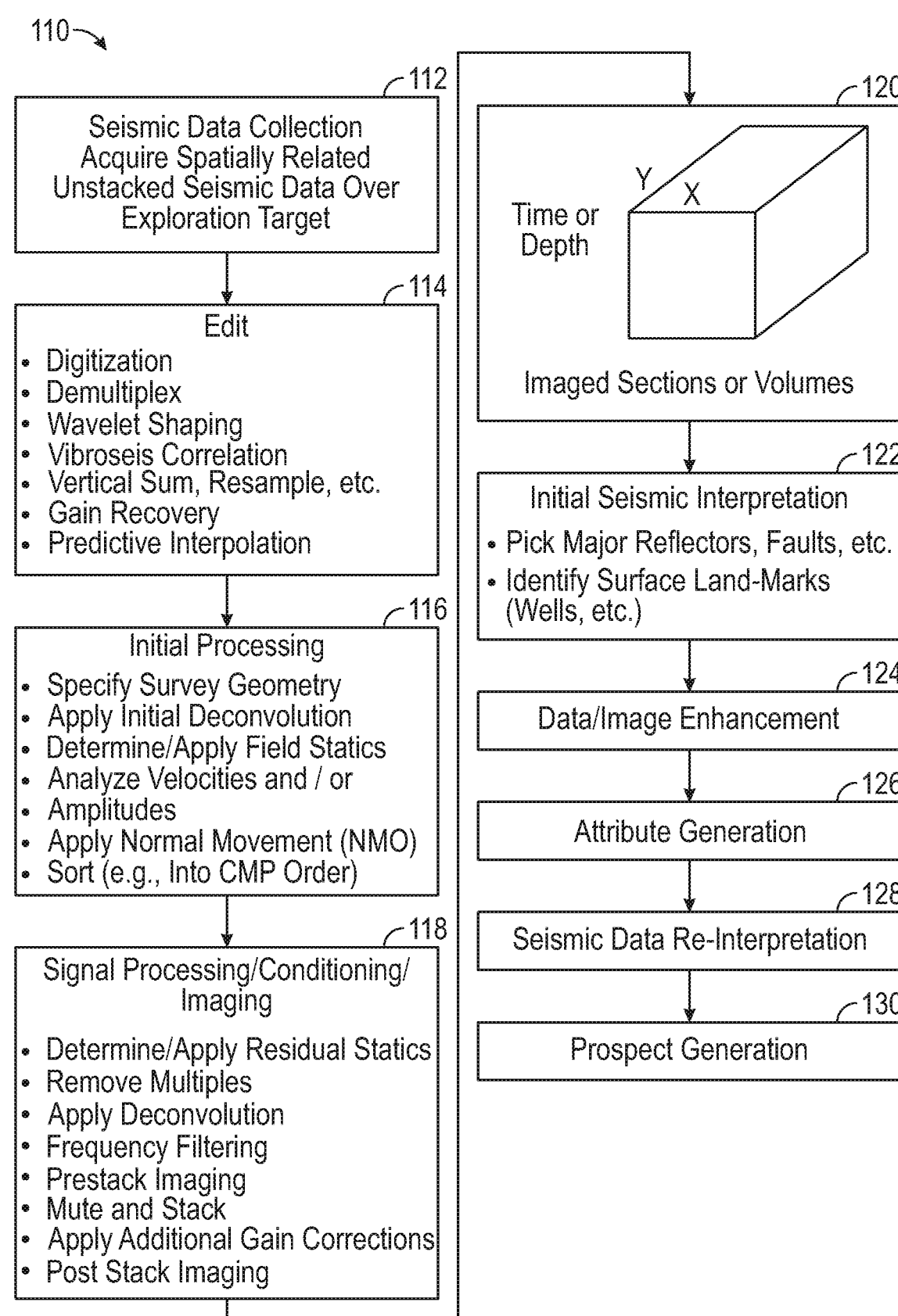
FIG. 6 illustrates a seismic processing sequence used by the computing system of FIG. 4 to receive data acquired and analyze the data acquired, in accordance with embodiments presented herein.

The above-described systems and methods may be used when performing seismic processing described in FIG. 6. FIG. 6 illustrates a method 110 for generating prospects and preparing seismic data for interpretation. Those of ordinary skill in the art may recognize that the processing steps illustrated in FIG. 6 broadly represent the processes that may be applied to seismic data and/or broadly represent the choice and/or an order of the processes. Any suitable techniques may be used and may vary from the depicted processes based at least in part on the individual seismic processor, signal source (e.g., dynamite, vibrator, airgun, low-frequency generator), survey location (e.g., land, sea) of the data, a company that processes the data, or the like. For ease of discussion, the computing system 60 is described as performing the method 110 below to prepare and analyze seismic data for prospect generation.

At block 112, the computing system 60 may conduct a seismic survey (e.g., 2-D, 3-D, 4-D, or the like) over a particular volume of the subsurface of the Earth. The data collected may include unstacked (e.g., unsummed) seismic traces. The unstacked seismic traces may include digital information representative of a volume of the Earth lying beneath the survey. The computing system 60 may use any suitable data collection technique. Note that for ease of description, the seismic survey performed at block 112 is a blended source survey where reflections from a later source activation may interfere with (or coincide in time with) reflections from an earlier one (e.g., a first activation of the source 40 interferences with a second and later activation of the source 40). After the shots or sources have been separated according to techniques described herein, the resulting unstacked seismic traces may be useable for additional seismic analysis. Thus, present systems and methods may permit multiple seismic traces to be obtained from sources 40 that produce overlapping signals based on the activation pattern of the sources 40. It is noted that the resulting separated seismic data sets at e equivalent to or substantially equivalent to seismic data sets obtained using fully separated source activations and seismic data acquisitions (e.g., non-overlapping sources and unstacked seismic traces).

The purpose of a seismic survey is to acquire a collection of spatially-related seismic traces over a subsurface target of economic interest. Data suitable for analysis by systems and methods disclosed herein may include an unstacked 2-D seismic line, an unstacked 2-D seismic line extracted from a 3-D seismic survey, an unstacked 3-D portion of a 3-D seismic survey, or the like. For ease of discussion, traces included within a 3-D survey (stacked or unstacked as the discussion warrants) are discussed herein, however it should be appreciated that any assembled group of spatially related seismic traces may be used.

At block 114, the computing system 60 may edit (e.g., preparatory processing, initial processing) the acquired seismic data. Thus, the computing system 60 may edit the acquired seismic data in preparation for subsequent processing (e.g., digitization operations, demultiplexing operations, vertical summing, resampling, gain recovery, wavelet shaping, bad trace removal, predictive interpolation per methods described in FIG. 7, or the like).

At block 116, the computing system 60 may perform additional processing (e.g., initial processing) to the acquired seismic data after editing operations of the block 114. The additional processing may include specification of the geometry of the survey and/or storing of a shot/receiver (e.g., receiver 44, 46) number and a surface location as part of each seismic trace header. Once the geometry has been specified, a velocity analysis may be performed and/or a normal move out (NMO) correction may be applied to correct each trace in time, thereby accounting for signal arrival time delays caused by offset. In some embodiments, computing system 60 may reference the editing operations from the block 114 during the processing operations of the block 116, such as in conjunction with or in place of the wavelet shaping/Vibroseis® correlation steps.

After completion of initial pre-stack processing (e.g., blocks 114, 116), the computing system 60 may, at block 118, process, condition, and/or image the seismic signal on the unstacked seismic traces before creating stacked (e.g., summed) data volumes. The computing system 60 may generate a stacked seismic volume or, in the case of 2-D data, a stacked seismic line for use in the exploration for hydrocarbons within the subsurface of the Earth (e.g., represented within block 120). Any digital sample within a stacked seismic volume may be uniquely identified by one or more parameters or data fields. For example, a unique seismic volume may be identified via a (X, Y, TIME) triplet, where X and Y coordinates may represent some position on the surface of the Earth and the time coordinate may indicate a recorded arrival time within the seismic trace. For ease of discussion, as referred to herein the X direction corresponds to the "in-line" direction, and the Y direction corresponds to the "cross-line" direction, as the terms "in-line" and "cross-line" are generally understood in the art. Although time is a preferred vertical axis unit, those skilled in the art understand that other units may be used as the vertical axis units, for example, depth or frequency. Conversion of seismic traces from one axis unit (e.g., time) to another (e.g., depth) may be possible via mathematical conversion techniques.

At block 122, the computing system 60 may perform an initial seismic interpretation of the resulting stacked volume (e.g., represented within block 120), where principal reflectors and/or faults are located and identified wherever occurring in the stacked seismic volume (e.g., data set). The computing system 60 may perform, at block 124, additional data enhancement operation on the stacked seismic data and/or may perform, at block 126, an attribute generation operation on the stacked seismic data. In some cases, the computing system 60 may, at block 128, revisit or reinterpret an original interpretation of the stack seismic data in light of the additional information obtained from the data enhancement and/or attribute generation operations.

At block 130, the computing system 60 may combine information gleaned from the seismic data with other data to generate prospects, such as magnetic surveys, gravity surveys, Landsat program data, regional geological studies, well logs, well cores, or the like. The prospects may be used to locate subsurface structural or stratigraphic features conducive to the generation, accumulation, and/or migration of hydrocarbons, or the like.

Turning to the systems and methods disclosed herein, before beginning the seismic stacking (e.g., in block 118), application of a POCS interpolation algorithm in connection with interpolating missing data and creating regularized seismic surveys can be undertaken. A first POCS interpolation algorithm methodology is described with respect to FIG. 7, which details a method that may be performed by the computing system 60.

Figure 7:
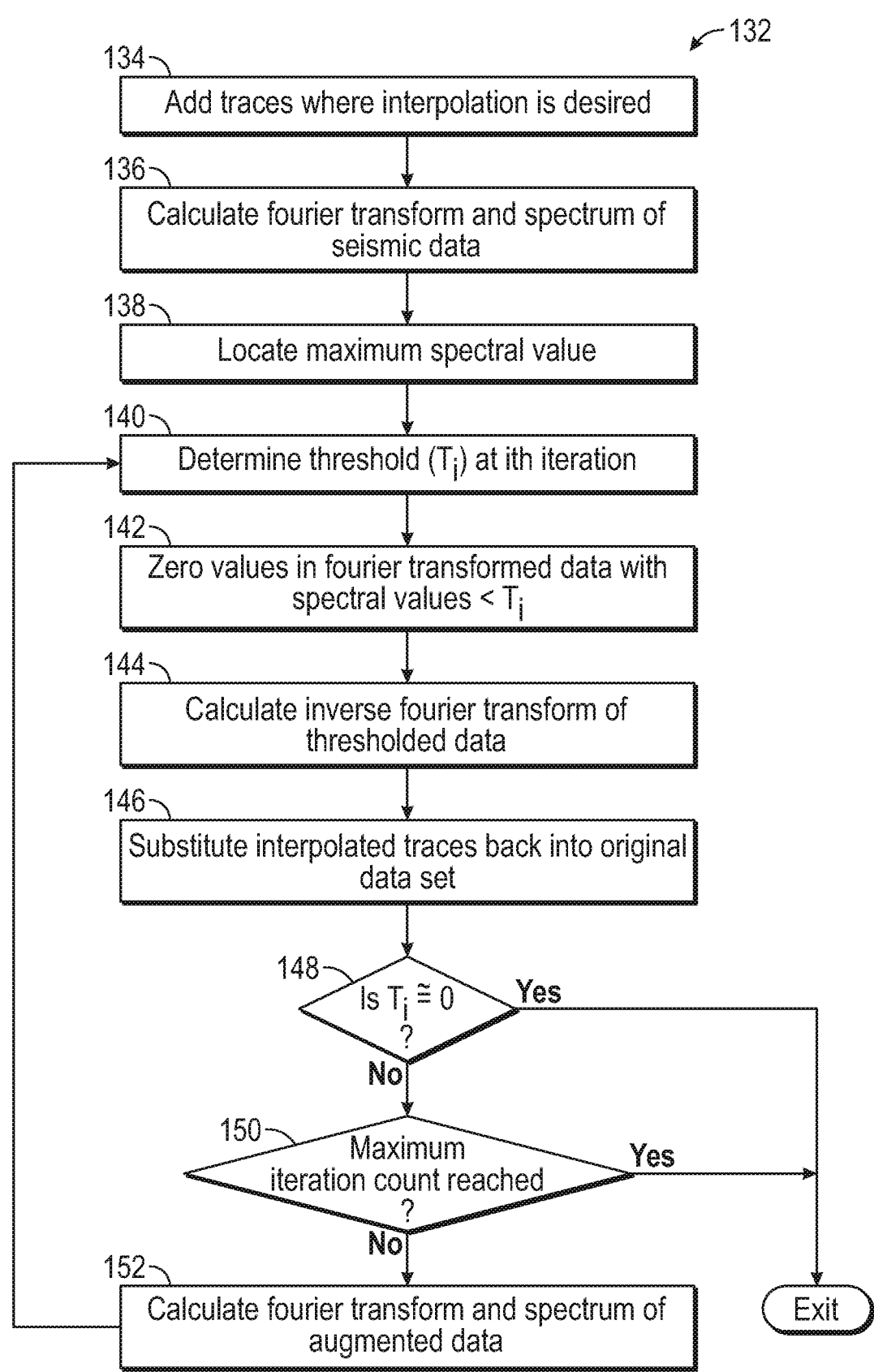
FIG. 7 illustrates a method implementing a first Projection Onto Convex Sets (POCS) interpolation algorithm as generally applied to seismic data from the marine survey systems of FIG. 2, FIG. 2A, and/or the land survey system of FIG. 3, in accordance with embodiments presented herein.

FIG. 7 illustrates a method 132 illustrating a POCS interpolation algorithm as generally applied to seismic data. At block 134, seismic traces are inserted into the seismic survey at locations where it is desired to obtain interpolated data. This insertion may occur at locations having skips or gaps in the received seismic data, that is, empty traces of the seismic dataset where no seismic energy is acquired in data acquisition. It should be noted that in cases where a seismic trace is to be interpolated because of the presence of a noise burst, and that noise bursts does not extend throughout the entire trace (or where partial traces of other sorts are available), it is certainly possible that only the noisy sections of the trace might be replaced with a constant value such as zero. In most instances, the edges of the regions containing zero-filled traces are smoothed to reduce the effect of Fourier wraparound. In other scenarios, edge smoothing will not be performed, with the zeroed traces being used as an indicator to the instant algorithm that the edge of the actual data has been reached.

A 2D (or 3D, 4D, etc., depending on the data that is to be interpolated) Fourier transform (e.g., a fast Fourier transform or a discrete Fourier transform) is next calculated at block 136. In the event that the data are 3D, the Fourier transform will be taken over all three axes f, $k_x$, $k_y$ where f is the frequency, and $k_x$ and $k_y$ are the wavenumbers in x and y directions respectively. The Fourier transform is also called F-K transform. In some embodiments, the 3D transform may not be taken over the entire survey but, instead, can be calculated by a moving window of, a predetermined number (e.g., 25 by 25) of traces laterally and a predetermined number (e.g., between 100 to 500) of samples in time. Utilizing windows and dividing the entire survey into smaller windows operates to make the calculation required to update the Fourier transform at each iteration much more tractable. Accordingly, the Fourier components (e.g., complex magnitude) of each window are calculated from the Fourier transformed data values in block 136. In block 138, the maximum energy value is determined as the portion of the F-K transformed data having the strongest amplitude. The F-K transformed data represents a frequency ("F"), i.e., the Fourier transform of the data over time, and a wave number ("K"), i.e., the Fourier transform of the data over space, of the Fourier components (as measured over all samples in the Fourier transformed dataset). The determined maximum energy value may also be referred to as having the highest energy value. Thereafter, in block 140, a threshold value at $i^{th}$ iteration (Ti) is calculated. The threshold value Ti is based on a function of the max energy value (or amplitude) in F-R domain and the iteration number i. For example, the maximum spectral value is divided by the predetermined number of iterations that is desired to run the algorithm to yield the threshold increment. If a maximum energy value (or amplitude) of the Fourier components is 10,000 and a maximum of 1000 iterations are to be performed, the threshold at the $i^{th}$ iteration could be calculated to be (1000–i)/ 1000×10,000. However, the function of threshold value Ti does not have to be linear, it could also be any other decreasing function that starts with the maximum spectral value at the $1^{st}$ iteration and ends with a value equal or close to zero at the last iteration. For example with a power function, the threshold value Ti could be calculated to be ((1000–i)/1000)$^n$×10,000 in the given example, where n is a positive number.

Within the Fourier transformed data, the Fourier samples that have an energy magnitude less than the current threshold are set to zero in block 142 to create a modified Fourier transformed dataset (i.e., hard thresholding). The modified Fourier transformed dataset is inverse transformed in block 144, and, for the traces that are not added for interpolation, each of the (partially) interpolated traces from the inverse transformed dataset is substituted back into the original dataset to create a modified dataset in block 146. This creates an augmented dataset that contains the original traces and the partially interpolated traces.

In block 148, the computing system 60 determines whether the current threshold is (or is approximately equal to) zero. If the current threshold is determined to be (or is approximately equal to) zero in block 148, convergence is determined to have been obtained and the process is terminated. However, if, in block 148, the current threshold is determined not to be (or is approximately not equal to) zero, the computing system 60 determines whether a maximum iteration count has been reached in block 150. If the maximum iteration count has been reached in block 150, the process is terminated. Else, the time-domain data including the current estimates of the interpolated traces (the augmented dataset) is retransformed in block 152, and a new threshold value is calculated by the predefined decreasing function in block 140.

As previously noted, the foregoing method 132 illustrated in FIG. 7 is one approach utilizing a POCS interpolation algorithm. However, in an embodiment, this method 132 is modified as described below to reduce the total number of iterations undertaken to complete the method 132 of FIG. 7 so as to reduce the computational costs and time required to perform the method 132 of claim 7. This may include modification of block 140 so that the subsequent thresholding is not tied to a single threshold value (e.g., Ti). Instead, an array of thresholding values are generated, as further described below.

Figure 8:
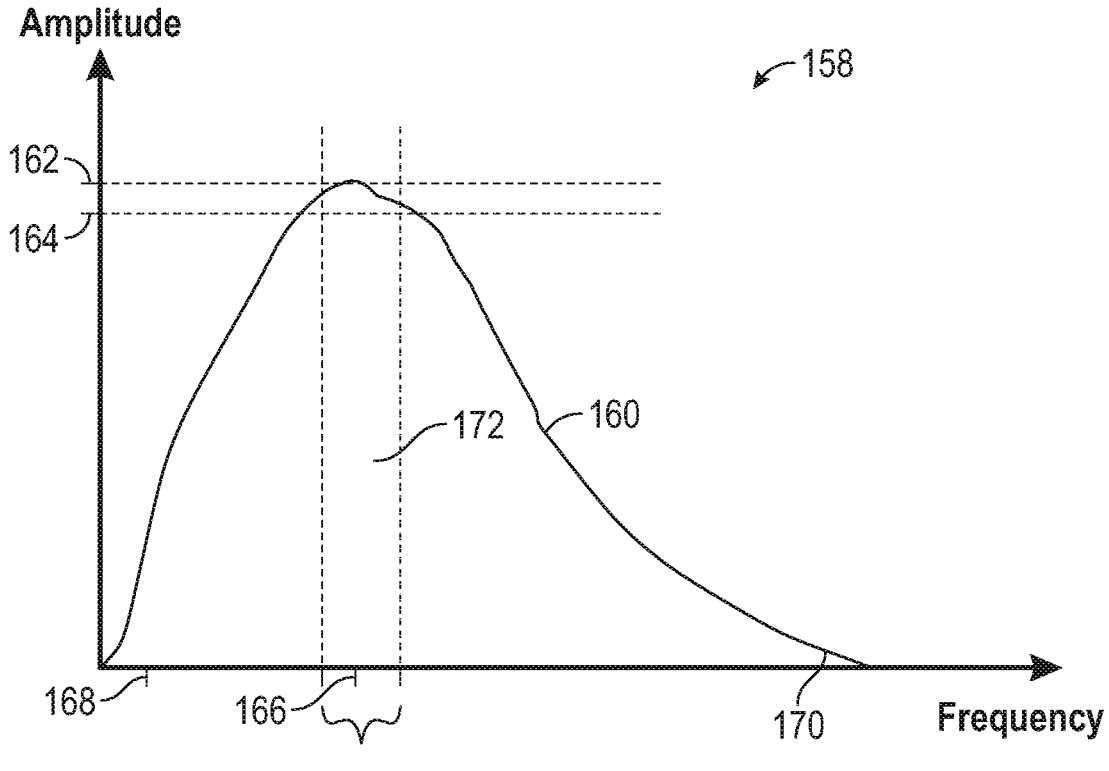
FIG. 8 illustrates a graph of a seismic frequency spectrum generated via the method of FIG. 7, in accordance with embodiments presented herein.

FIG. 8 illustrates a graph 158 of a seismic frequency spectrum generated, for example, via block 136. As illustrated, the graph 158 represents the maximum amplitude vs frequency of the Fourier transformed dataset 160 (in 2-D, 3-D or higher dimension). In the graph 158, the maximum amplitude for each frequency can be generated by scanning through all F-K moving windows for the highest energy. As previously discussed with respect to block 138, a maximum spectral value, represented by the maximum amplitude value (Vmax) 162 of the Fourier transformed dataset 160, is determined. As previously noted, threshold Ti is determined with the maximum spectral value and iteration number (block 140), the initial threshold value is chosen to be close to the maximum spectral value (block 140), and the threshold value is represented by Ti 164 in graph 158. The method 132 may proceed and will continue to iterate by moving Ti 164 from the maximum spectral value 162 to a value equal or close to zero amplitude on the graph 158 with each iteration.

As illustrated, in conjunction with the method 132, the maximum spectrum curve centers around a peak frequency $F_O$ 166 that tends to be located closer in frequency to the lowest frequency $F_L$ 168 portions of the seismic frequency spectrum relative to the highest frequency (Nyquist frequency) $F_H$ 170 portions of the seismic frequency spectrum. In this manner, as the iterations of method 132 proceed, the region 172 surrounding peak frequency $F_O$ 166 will be processed the greatest number of times. The portions of the graph 158 that are at or above Ti 164 are most numerous in the region 172. Thus, as Ti 164 is iteratively moved downwards to include more of portions of graph 158, the portions values in region 172 will continue to be processed while, for example, amplitudes near the highest frequency $F_H$ 170 will be exempted (i.e., will be set to zero in block 142), since the amplitudes near the highest frequency $F_H$ 170 of the seismic frequency spectrum will have energy magnitude less than the current threshold (Ti 164) until a high number of iterations have been completed. This results in, for example, instances in which 90% of more of the total number of iterations are completed prior to some frequencies (e.g., the highest frequency $F_H$ 170 portions of the seismic frequency spectrum) being included in the method 132, which can also lead to reduced resolution of the final data generated for these areas (due to the relatively few number of iterations experienced). Accordingly, a second POCS interpolation algorithm may be applied, as described in conjunction with FIG. 9, which performs interpolation more efficiently than the POCS interpolation algorithm previously described in conjunction with FIG. 7.

Figure 9:
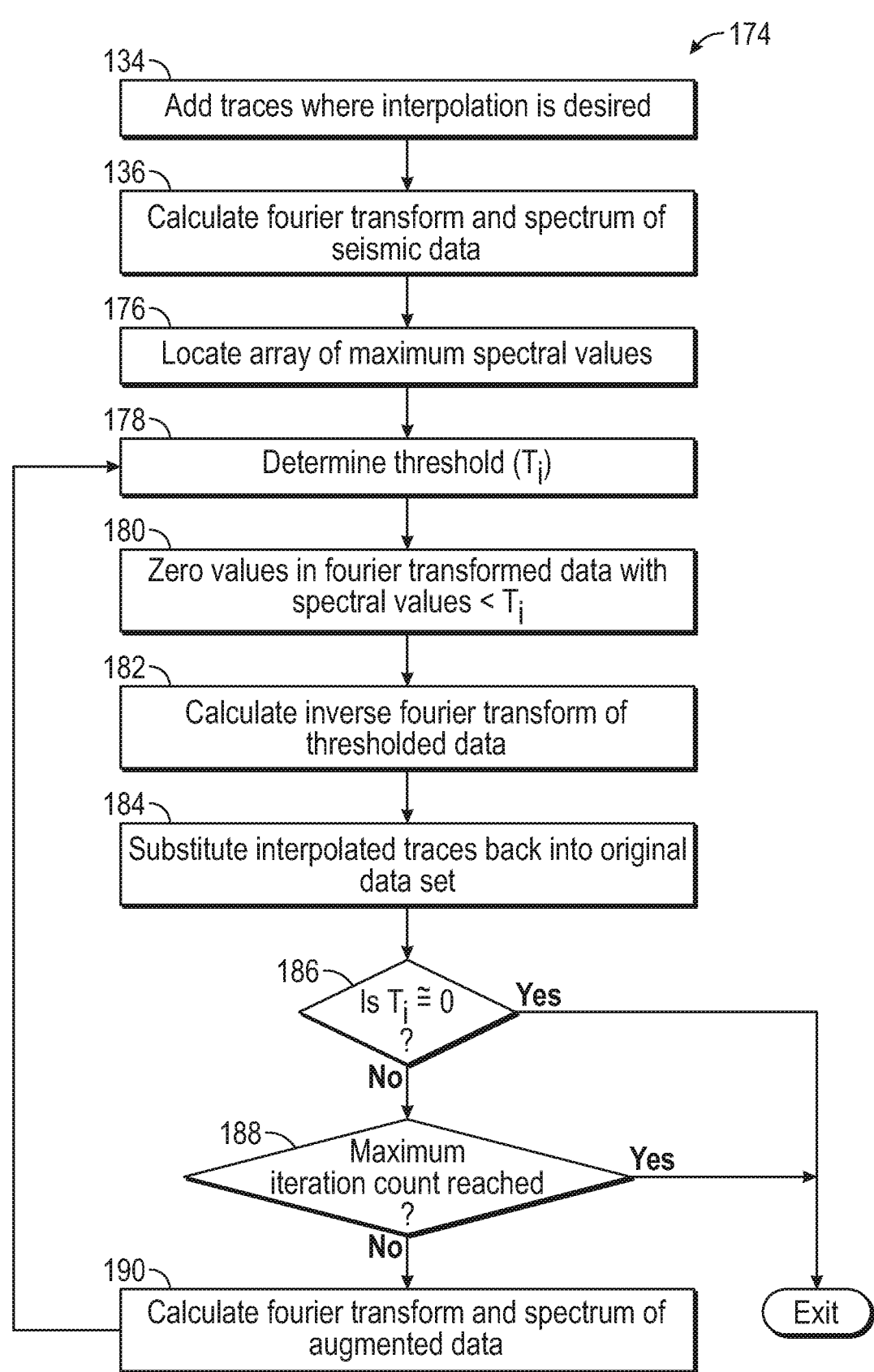
FIG. 9 illustrates a method implementing a second POCS interpolation algorithm as generally applied to seismic data from the marine survey systems of FIG. 2, FIG. 2A, and/or the land survey system of FIG. 3, in accordance with embodiments presented herein.

FIG. 9 illustrates a method 174 illustrating application of a POCS interpretation algorithm as generally applied to seismic data with reduced iterations relative to method 132. It should be noted that the POCS interpretation algorithm described below with respect to FIG. 9 can be implemented on or by the computing system 60 (i.e., as instructions or code stored on tangible non-transitory computer readable media, such as memory 66 or storage 68, and executed by processor 64 when the computing system 60 is in operation).

At block 134, seismic traces are inserted into the seismic survey at locations where it is desired to obtain interpolated data. This insertion may occur at locations having skips or gaps in the received seismic data, that is, empty traces of the seismic dataset where no seismic energy is acquired in data acquisition. It should be noted that in cases where a seismic trace is to be interpolated because of the presence of a noise burst, and that noise bursts does not extend throughout the entire trace (or where partial traces of other sorts are available), it is certainly possible that only the noisy sections of the trace might be replaced with a constant value such as zero. In most instances, the edges of the regions containing zero-filled traces are smoothed to reduce the effect of Fourier wraparound. In other scenarios, edge smoothing will not be performed, with the zeroed traces being used as an indicator to the instant algorithm that the edge of the actual data has been reached.

A 2D (or 3D, 4D, etc., depending on the data that is to be interpolated) Fourier transform (e.g., a fast Fourier transform or a discrete Fourier transform) is next calculated at block 136. In the event that the data are 3D, the Fourier transform will be taken over all three axes (f, $k_x$, $k_y$) where f is the frequency, and $k_x$ and $k_y$ are the wavenumbers in x and y directions respectively. In some embodiments, the 3D transform may not be taken over the entire survey but, instead, can be calculated by a moving window of, a predetermined number (e.g., 25 by 25) of traces laterally and a predetermined number (e.g., between 100 to 500) of samples in time. Utilizing windows and dividing the entire survey into smaller windows operates to make the calculation required to update the Fourier transform at each iteration much more tractable. Accordingly, the Fourier components (e.g., complex magnitude) of each window are calculated from the Fourier transformed data values in block 136.

In block 176, the maximum energy value (i.e., the strongest amplitude of the F-K transformed data, thus having the highest energy value.) is determined for each frequency of a set of frequencies of the seismic frequency spectrum (i.e., the spectrum of seismic data calculated in block 136) as an array of maximum spectral values. The total number of frequencies in the set of frequencies may be predetermined, may be calculated (e.g., based on the total frequency bandwidth of the seismic frequency spectrum), or may otherwise be selected as including either individual frequency values or finite frequency ranges each corresponding to two or more individual frequency values. The maximum energy value for each respective frequency of the set of frequencies is located as an array of maximum spectral values (i.e., a particular maximum spectral value that corresponds to the strongest amplitude for a particular frequency). In this manner, a single maximum spectral value (e.g., Vmax 162 from FIG. 8) is not determined with respect to an entire set of frequencies of the seismic frequency spectrum, as previously described with respect to method 132; rather, individual maximum energy values for each frequency of the seismic frequency spectrum are located (determined), as illustrated in the curve plotted in FIG. 8 by the computing system 60 in block 176 as an array of maximum spectral values.

In block 178, a threshold array (Ti) as a function of frequency (f) and the iteration number i is calculated. In one embodiment, the threshold array is linearly decreasing as the iteration i increases. For example, if the maximum energy value (or amplitude) of the Fourier components at frequency 40 Hz is 10,000 and the maximum energy value (or amplitude) of the Fourier components at frequency 100 Hz is 4000, and a maximum of 100 iterations are to be performed, the threshold at the $i^{th}$ iteration for 40 Hz could be calculated to be $10{,}000 \times (100-i)/100$, and the threshold at the $i^{th}$ iteration for 100 Hz could be calculated to be $4000 \times (100-i)/100$. In other embodiments, individual threshold decrements for each frequency may instead be determined, whereby the maximum spectral value for each frequency is divided by the predetermined number of iterations that it is desired to run the algorithm to yield the threshold decrement for each individual frequency of the set of frequencies. It should be noted that the threshold function does not have to be linearly decreasing along iteration step, it may also be a power function or any other decreasing function that starts with the maximum spectral value for each individual frequency of the set of frequencies at the $1^{st}$ iteration, and ends with a value equal or close to zero at the last iteration.

It should be noted that this process of decrementing the threshold value for each frequency of the set of frequencies for each iteration calculated in block 178 is performed in parallel for each frequency of the set of frequencies, in contrast to method 132. That is, computing system 60 performs block 178 (as well as the subsequent blocks 180 and 182) on all frequencies of the set of frequencies at the same time (i.e., in parallel), in contrast to blocks 140, 142, and 144 of method 132 (in which is processing is only performed on the frequencies having maximum spectral values which are larger than a current threshold value. This technique of performing block 178 (as well as the subsequent blocks 180 and 182) on all frequencies of the set of frequencies in parallel reduces the total number of iterations required for method 174 to be completed since, for example, iterations are completed on some frequencies (e.g., the highest frequency $F_H$ 170 portions of the seismic frequency spectrum) in method 174 more rapidly than they would be utilizing method 132. This results in reduced cost, as well as having an additional benefit of generating improved results, since particular frequencies (e.g., the highest frequency $F_H$ 170 portions of the seismic frequency spectrum) will have a greater number of iterations performed thereon utilizing method 174 relative to method 132.

Returning to method 174, within the Fourier transformed data, the Fourier samples that have energy magnitude less than the current threshold at each frequency of the set of frequencies are set to zero in block 180 to create a modified Fourier transformed dataset (i.e., hard thresholding) that corresponds to each frequency. Each modified Fourier transformed dataset is inverse transformed in block 182 and each (partially) interpolated trace from each of the inverse transformed datasets is substituted back into the original dataset to create a modified dataset in block 184. This creates a augmented dataset that contains the original traces and the partially interpolated traces.

In block 180, for the amplitude values in F-K domain larger than the threshold values of their corresponding frequencies, the values may be kept the same (hard thresholding), scaled by a factor $\alpha=(A-Ti)/A$ where A is the amplitude value in F-K, domain and Ti is the threshold value for the corresponding frequency (soft thresholding), or scaled by a factor between 1 and $\alpha$.

In block 186, the computing system 60 determines whether the current threshold for each frequency is (or is approximately equal to) zero. If the current threshold is determined to be (or is approximately equal to) zero for all frequencies in block 186, convergence is determined to have been obtained and the process is terminated. However, if, in block 186, the current threshold is determined not to be (or is approximately not equal to) zero for one or more frequencies of the set of frequencies, the computing system 60 determines whether a maximum iteration count has been reached in block 188. If maximum iteration count has been reached in block 188, the process is terminated. Else, the time-domain data including the current estimates of the interpolated traces (the augmented dataset) is retransformed in block 190, a new threshold value is calculated by decrementing the previous threshold value in block 178 for each frequency, and the process continues.

In should be acted that the POCS interpretation algorithm applied in method 174 may also be applied in other seismic processing contexts, for example, in conjunction with an improved method of deblending different types of data. In blended acquisition, receivers record signals generated by multiple sources at the same time and turn the recording into continuous time series. The continuous recordings are split into seismic traces with each trace corresponding to the signals generated by one source excitation. The process of separating the signals from different source excitations is called deblending. In deblending, the continuous recording from a receiver is first combed or pseudo-deblended into a common receiver gather. The combing or pseudo-deblending operation may be considered to be slicing fixed length of recordings from the whole time series into samples that correspond to the time of source excitations (shots), and then sorting the fixed length of recordings based on the 2-D or 3-D geometry of the shot locations. In the combed common receiver gather, the coherent events are the signals matching the shot times, while the blending noises are the signals generated by other overlapping shots. Inversion-based deblending may iteratively construct primary coherent signals with a sparsity-promoting transform, e.g., the POCS scheme with F-K transform.

Figure 10:
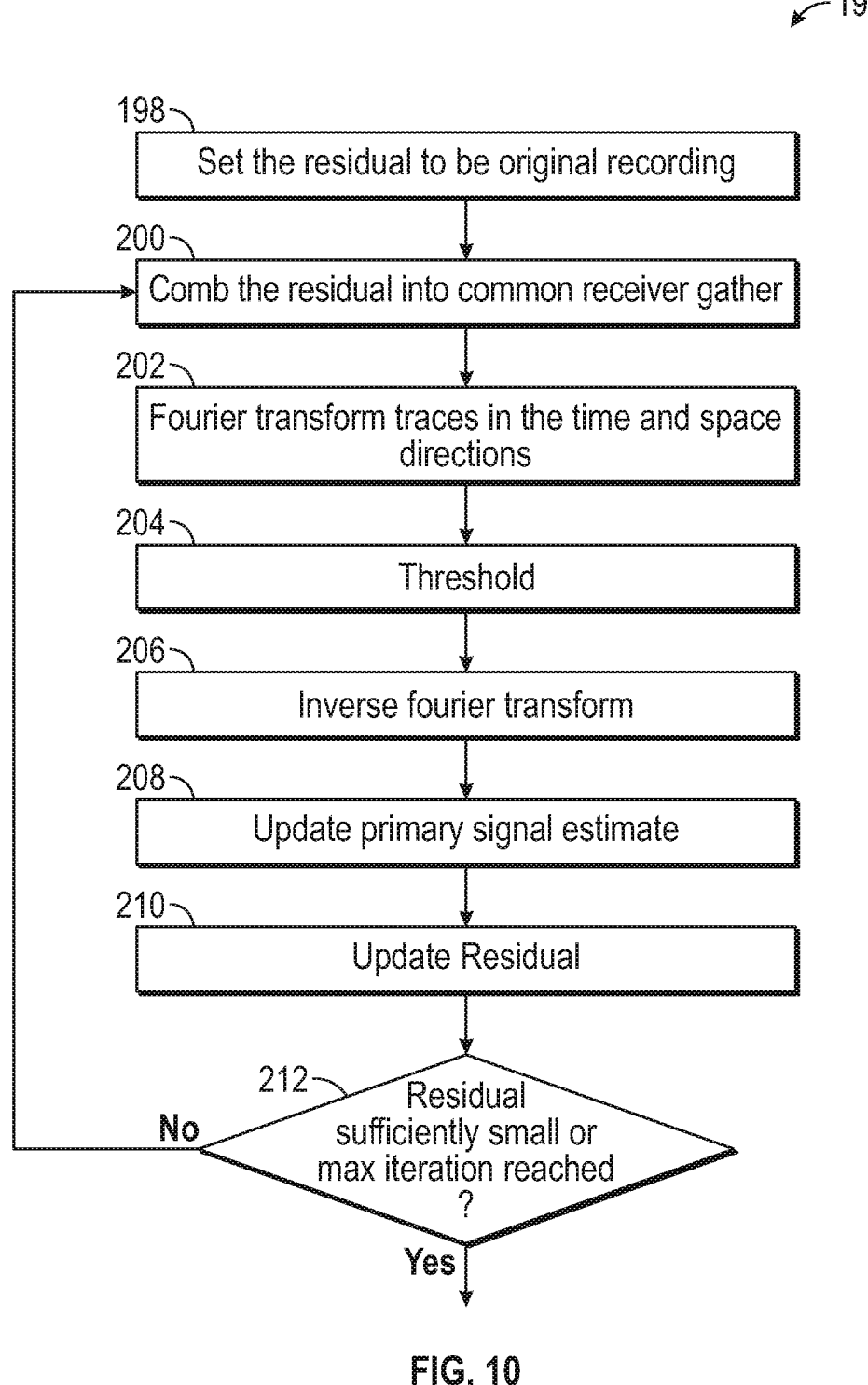
FIG. 10 illustrates a method implementing the second POCS scheme of FIG. 9 in deblending operations, in accordance with embodiments presented herein.

FIG. 10 illustrates one example of a method 196 that may be used to perform deblending. The method 196 generally leverages a POCS scheme consistent with method 174 (e.g., utilizing the above described second POCS interpolation algorithm) to predict primary coherent signals overlapped by contaminated blending noises (e.g., non-coherent signals). Although the method 196 is described in a particular order and performed by the computing system 60, it is noted that the method 196 may be performed by any suitable processing circuitry or processor.

At block 198, the computing system 60 may access the continuous recording of any-selected receiver (e.g., receiver 33, 36, 44, or 46). The residual, which is the difference between original recorded data and the blended data of primary coherent signal estimate, is initially set to be the original recorded data, as the estimate of primary coherent signal (e.g., a primary signal) is zero initially. At block 200, the computing system 60 may comb or pseudo-deblend the residual data into a common receiver gather based on the geometry of shot positions, where the desired signals are to be coherent. It is noted that in some embodiments, each of seismic source 32, 40 may include multiple sources. For example, an air gun source may include multiple air gun subarrays (e.g., multiple sources, seismic source groups), each composed of multiple air guns fired in a synchronized manner. Furthermore, since air guns may sometimes generate shots via sources having differing frequency spectrums, or via sources having differing survey geometries, processing operations can be improved by applying different constraints onto the traces of the selected shots based on the particular frequency spectrum and/or survey geometry of the source. Customizing processing based on the source may improve the organizing of the data into appropriate gathers. In a combed common receiver gather, the noise or overlapping signals generated by the other interfering sources 32, 40 (e.g., another air gun source fired within the recording time window, or low frequency source signals interfering with air gun source) are incoherent or less coherent than the primary signals. It is noted that, although a common receiver gather can be used in one example embodiment, another embodiment may use and/or be utilized in other time, depth, and/or space domain(s), where the primary signal is coherent while the interference noise is incoherent.

At block 202 (corresponding to block 136 of method 174 as well as block 178 and block 190 of method 174), the computing system 60 may perform a Fourier Transform on the traces of the combed gather or the sum of the combed gather and the primary signal estimate from previous iteration(s) in the time and space directions, such that the desired signal may become "sparse" in that domain. At block 204 (corresponding to block 180 of method 174), the computing system 60 may threshold the data via thresholding operations (e.g., threshold operations), such that values above a given threshold value(s) may be preserved. The threshold value(s) may change throughout the iterations to include lower coherence signals in later iterations. Instead of setting the threshold in any iteration to be the same for all frequencies as block 140, the threshold at block 204 for each iteration is set to be an array, as in block 178.

At block 206 (corresponding to block 182 of method 174), the computing system 60 may perform an inverse Fourier Transform to return the data in the transformed gather to its original time-space domain. The data after the inverse Fourier Transform represents primary signals separated from the latest iteration. The primary signals estimated in the latest iteration may be added up with the primary signal estimate from previous iteration(s) by weighted sum, to generate an updated primary signal estimate at block 208.

In some embodiments, the time-space windows that the Fourier transform is performed on may be contaminated by strong interference noise, from another type of source or the same type of source without strong attenuation. In that case, a spectral weighting may be applied at block 202 prior to the calculation of the maximum spectral values. In the case where a spectral weighting is applied at block 202, the spectral weighting may be removed at block 206 prior to the inverse Fourier Transform.

In some embodiments, the seismic acquisition is performed with seismic sources 32, 40 positioned on an irregular or non-uniform grid, either due to surface terrain or by acquisition design. It may be desired to interpolate the source position to regular grids. For example, the regularization and interpolation may improve coherency of primary signals for source deblending and/or may help image subsurface structure for geology interpretation. In such case, interpolation operators may be added to the method 196. The interpolation operators may estimate the signals on non-uniform grid (e.g., irregularly spaced) based on the signals on a uniform grid (e.g., regularly spaced) or estimate the signals on the uniform grid based on the signals on a non-uniform grid (e.g., irregularly spaced). The interpolation operator may be applied in block 202, such that the spatial Fourier Transform is performed on signal traces on the uniform grid. Another interpolation operator may be applied in block 206, such that after Fourier Transform, the signal traces on uniform grid (e.g., regularly paced) are converted back to an original non-uniform grid. In this way, the computing system 60 may reconstruct signals back to an original non-uniform grid based on the predicted signals in the uniform grid, when the signals are acquired in the non-uniform grid. In some embodiments, the computing system 60 may reconstruct signals acquired in a uniform grid and reconstruct the signals back into a non-uniform grid for residual update, for example, in connection with the step at block 210.

Blocks 202, 204, and 206 generally make up a POCS process, akin to the interpolation process using the POCS scheme. Blocks 208 and 210 may be performed to update the estimated primary signal and residual energy which is to be separated into primary signals in future iterations.

At block 208, the computing system 60 may access the gather output of block 206 in time-space domain from the latest iteration and previous iteration(s), and perform a weighted sum of the data from the latest iteration and the data from previous iteration(s). The weighting may improve stability of the iterations, especially when multiple sources (e.g., >4 sources) are fired in close temporal proximity and are recorded by the same receiver(s). At block 210, the computing system 60 may predict the blended continuous data based on the latest primary signal estimate, by blending (adding) the traces from the updated primary signal estimate into a continuous record with a time shift applied to each of the traces corresponding to the time of source excitation of the trace. The residual may be computed by taking a difference between the original continuous recording and the blended continuous data. The residual represents the leftover energy to be separated (deblended) in the rest of the iteration(s). At block 212, the computing system 60 may check the amplitude of the residual (e.g., if the maximum amplitude of the residual is below 0.1% of original data) to determine if the residual is sufficiently small and contains background noise only. When the residual is sufficiently small (or a maximum iteration count threshold is reached), the computing system 60 outputs the final updated primary signal estimate as the deblended result. Otherwise, the computing system 60 proceeds, at block 200, to repeat the combing operation on the residual continuous data to form a common receiver gather where the additional primary signals are coherent and to be separated in the following iteration(s).

Technical effects of this disclosure include systems and methods for reducing weak-coherence signals (e.g., non-coherent blending noise) of a data set that may affect seismic data processing of the data set. These weak-coherence signals may be discarded based at least in part on an inability to interpret a signal expected at the position in the data set of the weak coherence signal. However, by using inversion based deblending to iteratively construct/separate primary coherent signals and predict the weak coherence signals (blending noise) with the constructed/separated primary coherent signals, seismic data processing operations may improve. Resulting gathers which include relatively clean gathers with signals matching the corresponding source excitations (in comparison to a gather that mixes signals from source excitations within overlapping time windows) may be used both for imaging, prestack analysis such as AVO (Amplitude vs Offset) analysis, and velocity-model building, for example, by Full-Waveform Inversion (FWI). Thus, these separation and processing operations described herein may cause improved data inputs into seismic image generators. When data inputs into the seismic image generators are improved, the resulting seismic image may also improve, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer-implemented method of seismic exploration above a region of subsurface containing structural or stratigraphic features conducive to determining a presence, migration, or accumulation of hydrocarbons, the method comprising:

controlling one or more seismic sources positioned on or above a surface region of Earth to emit seismic signals into the region of the subsurface, wherein the emitted seismic signals travel downward through the Earth and reflect off geological formations within the region of the subsurface;

receiving, via one or more receivers disposed on or above the region of the subsurface, reflected seismic signals returned from the region of the subsurface to obtain a seismic dataset of a seismic survey based on the reflected seismic signals;

accessing the seismic dataset that images at least a portion of a predetermined volume of Earth over the region of the subsurface;

sorting the seismic dataset into a time or depth and space domain such that the seismic response by the Earth is coherent in the sorted domain to generate a sorted seismic dataset;

splitting the seismic dataset in time or depth and space domain into smaller overlapping windows of at least one sub-dataset;

calculating a multi-dimension Fourier transform spectrum from each sub-dataset to produce multi-dimension Fourier transformed data;

determining, for each frequency of a set of frequencies of a seismic frequency spectrum, a maximum frequency spectral value corresponding to a particular frequency of the set of frequencies from the multi-dimension Fourier transformed data, wherein the maximum frequency spectral value represents a maximum energy value at the particular frequency;

selecting, for each frequency of the set of frequencies of the seismic frequency spectrum, a threshold value corresponding to the particular frequency of the set of frequencies, wherein each selected threshold value for each frequency of the set of frequencies is applied to the Fourier transformed data at the particular frequency to identify samples having an energy magnitude below the threshold value;

decrementing each threshold value of the plurality of threshold values iteratively to generate a decremented threshold value corresponding to each frequency of the set of frequencies;

generating a modified Fourier transformed dataset, wherein the modified Fourier transformed dataset is modified by setting Fourier samples of the multi-dimension Fourier transform spectrum having an energy magnitude less than the decremented threshold value at each frequency of the set of frequencies to zero;

inverse transforming the modified Fourier transformed dataset to generate a plurality of interpolated traces;

substituting each interpolated trace of the plurality of interpolated traces into originally empty traces of the seismic dataset where no seismic energy is acquired in data acquisition;

repeating a Fourier transform, thresholding and inverse transform to create a modified sub-dataset as an interpolated seismic sub-dataset;

merging all overlapping windows of the interpolated seismic sub-dataset to create an interpolated seismic dataset; and generating a seismic image of the region of the subsurface from the interpolated seismic dataset to illustrate locations within the region of the subsurface that include the hydrocarbons and locations within the region of the subsurface that include subsurface drilling hazards.

2. The computer-implemented method of claim 1, comprising determining which maximum spectral value of the plurality of maximum spectral values has a highest energy value in a Fourier transformed domain for each frequency of the set of frequencies.

3. The computer-implemented method of claim 2, comprising generating the threshold based on the maximum spectral value having the highest energy value and a predetermined number of iterations.

4. The computer-implemented method of claim 1, wherein the threshold comprises a respective threshold corresponding to each frequency of the set of frequencies.

5. The computer-implemented method of claim 4, comprising generating the respective threshold corresponding to each frequency of the set of frequencies based on the maximum spectral value corresponding to each frequency of the set of frequencies.

6. The computer-implemented method of claim 1, wherein each frequency of the set of frequencies corresponds to an individual frequency value.

7. The computer-implemented method of claim 1, wherein each frequency of the set of frequencies corresponds to a finite frequency range including two or more individual frequency values.

8. The computer-implemented method of claim 1, comprising determining whether the decremented threshold value for each frequency is equal to zero or is approximately equal to zero.

9. The computer-implemented method of claim 8, comprising determining whether a maximum iteration count has been reached.

10. The computer-implemented method of claim 9, comprising:

calculating a second Fourier transform spectrum of the modified dataset;

decrementing each decremented threshold value by a predefined decreasing function of the maximum spectral value and a number of iterations to generate a second decremented threshold value corresponding to each frequency of the set of frequencies;

generating a second modified Fourier transformed dataset, wherein the second modified Fourier transformed dataset is modified by setting Fourier samples of the second Fourier transform spectrum having an energy magnitude less than the second decremented threshold value at each frequency of the set of frequencies to zero;

inverse transforming the second modified Fourier transformed dataset to generate a plurality of second interpolated traces; and substituting each second interpolated trace of the plurality of second interpolated traces into the originally empty traces of the seismic dataset where no seismic energy is acquired in data acquisition to create a second modified dataset based upon the determining of whether the decremented threshold value for each frequency is equal to zero or is approximately equal to zero and whether a maximum iteration count has been reached.

11. A tangible, non-transitory, machine readable media, comprising instructions configured to cause a processor to:

control one or more seismic sources positioned on or above a surface region of Earth to emit seismic signals into the subsurface region, wherein the emitted seismic signals travel downward through the Earth and reflect off geological formations within the subsurface region;

receive, via one or more receivers disposed relative to the surface region of the Earth, reflected seismic signals returned from the subsurface region to obtain a seismic dataset of a seismic survey based on the reflected seismic signals;

access the seismic dataset that images at least a portion of a predetermined volume of Earth, sort the seismic dataset into a time or depth and space domain such that the seismic response by the Earth is coherent in the sorted domain to generate a sorted seismic dataset, splitting the seismic dataset in time or depth and space domain into smaller overlapping windows of at least one sub-dataset;

calculate a multi-dimension Fourier transform spectrum from each sub-dataset to produce multi-dimension Fourier transformed data;

determine, for each frequency of a set of frequencies of a seismic frequency spectrum, a maximum frequency spectral value corresponding to a particular frequency of the set of frequencies from the multi-dimension Fourier transformed data, wherein the maximum frequency spectral value represents a maximum energy value at the particular frequency;

select, for each frequency of the set of frequencies of the seismic frequency spectrum, a threshold value corresponding to the particular frequency of the set of frequencies, wherein each selected threshold value for each frequency of the set of frequencies is applied to the Fourier transformed data at the particular frequency to identify samples having an energy magnitude below the threshold value;

decrement each threshold value of the plurality of threshold values iteratively to generate a decremented threshold value corresponding to each frequency of the set of frequencies;

generate a modified Fourier transformed dataset, wherein the modified Fourier transformed dataset is modified by setting Fourier samples of the multi-dimension Fourier transform spectrum having an energy magnitude less than the decremented threshold value at each frequency of the set of frequencies to zero;

inverse transform the modified Fourier transformed dataset to generate a plurality of interpolated traces; and substitute each interpolated trace of the plurality of interpolated traces into the empty traces of the seismic dataset where no seismic energy is acquired in data acquisition;

repeat a Fourier transform, thresholding and inverse transform to create a modified sub-dataset as an interpolated seismic sub-dataset;

merge all overlapping windows of the interpolated seismic sub-dataset to create an interpolated seismic dataset; and generate a seismic image of the subsurface region of the subsurface from the interpolated seismic dataset to illustrate locations within the subsurface region of the subsurface that include the hydrocarbons and locations within the subsurface region of the subsurface that include subsurface drilling hazards.

12. The tangible, non-transitory, machine readable media of claim 11, wherein the instructions cause the processor to:

determine which maximum spectral value of the plurality of maximum spectral values has a highest energy value in a Fourier transformed domain for each frequency of the set of frequencies; and generate the threshold based on the maximum spectral value having the highest energy value and a predetermined number of iterations.

13. The tangible, non-transitory, machine readable media of claim 11, wherein the threshold comprises a respective threshold corresponding to each frequency of the set of frequencies, wherein the instructions cause the processor to generate the respective threshold corresponding to each frequency of the set of frequencies based on the maximum spectral value corresponding to each frequency of the set of frequencies.

14. The tangible, non-transitory, machine readable media of claim 11, wherein each frequency of the set of frequencies corresponds to an individual frequency value.

15. The tangible, non-transitory, machine readable media of claim 11, wherein each frequency of the set of frequencies corresponds to a finite frequency range including two or more individual frequency values.

16. The tangible, non-transitory, machine readable media of claim 11, wherein the instructions cause the processor to:

determine whether the decremented threshold value for each frequency is equal to zero or is approximately equal to zero; and determine whether a maximum iteration count has been reached.

17. The tangible, non-transitory, machine readable media of claim 16, wherein the instructions cause the processor to:

calculate a second Fourier transform spectrum of the modified dataset;

decrement each decremented threshold value by a pre-defined decreasing function of the maximum spectral value and a number of iterations to generate a second decremented threshold value corresponding to each frequency of the set of frequencies;

generate a second modified Fourier transformed dataset, wherein the second modified Fourier transformed dataset is modified by setting Fourier samples of the second Fourier transform spectrum having an energy magnitude less than the second decremented threshold value at each frequency of the set of frequencies to zero;

inverse transform the second modified Fourier transformed dataset to generate a plurality of second interpolated traces; and substitute each second interpolated trace of the plurality of second interpolated traces into the originally empty traces of the seismic dataset where no seismic energy is acquired in data acquisition to create a second modified dataset based upon whether the decremented threshold value for each frequency is equal to zero or is approximately equal to zero and whether a maximum iteration count has been reached.

18. A method of seismic exploration above a region of subsurface containing structural or stratigraphic features conducive to determining a presence, migration, or accumulation of hydrocarbons, the method comprising:

accessing a seismic dataset of a seismic survey that images at least a portion of a predetermined volume of Earth over the region of the subsurface, setting a residual to the seismic dataset;

combing the residual into a common receiver gather;

splitting the common receiver gather into smaller overlapping windows of at least one sub-dataset;

calculating a multi-dimension Fourier transform spectrum from each sub-dataset to produce multi-dimension Fourier transformed data;

determining a plurality of maximum frequency spectral values from the multi-dimension Fourier transformed data, wherein each maximum frequency spectral value of the plurality of maximum frequency spectral values corresponds to a maximum energy value at a particular frequency of a set of frequencies of a seismic frequency spectrum;

selecting a plurality of threshold values, wherein each threshold value of the plurality of threshold values corresponds to one frequency of the set of frequencies;

decrementing each threshold value of the plurality of threshold values iteratively to generate a decremented threshold value corresponding to each frequency of the set of frequencies;

generating a modified Fourier transformed dataset, wherein the modified Fourier transformed dataset is modified by setting Fourier samples of the multi-dimension Fourier transform spectrum having an energy magnitude less than the decremented threshold value at each frequency of the set of frequencies to zero;

inverse transforming the modified Fourier transformed dataset to generate a plurality of deblended traces;

merging all windows of the at least one sub-dataset from the inverse Fourier transform to create a deblended common receiver gather;

updating a primary signal estimate utilizing the deblended gather to generate an updated primary signal estimate;

updating the residual based upon the updated primary signal estimate to generate an updated residual;

repeating the primary signal estimate by combing the updated residual and continuing the processing steps above until the residual is sufficiently small;

outputting the updated primary signal estimate as a deblended result;

identifying using the deblended result locations within the region of the subsurface that include the hydrocarbons and locations within the region of the subsurface that include subsurface drilling hazards;

determining a drilling path into the region of the subsurface that intersects the locations that include the hydrocarbons and avoids the locations that include the subsurface drilling hazards; and drilling a wellbore into the region of the subsurface along the drilling path.

19. The method of claim 18, wherein the deblended result is outputted based upon a determination of whether a value of an amplitude of the updated residual meets a threshold value.

20. The method of claim 18, wherein updating the residual based upon the updated primary signal estimate to generate an updated residual comprises:

blending traces from the updated primary signal estimate into a continuous record with a time shift applied to each of the traces from the updated primary signal estimate corresponding to a time of source excitation to generate blended continuous data; and calculating the difference between original continuous recording and the blended continuous data as the updated residual.

* * * * *